United States Patent [19]

Doura et al.

[11] Patent Number: 4,666,981

[45] Date of Patent: May 19, 1987

[54] RESIN COMPOSITIONS AND PRODUCTS USING THE SAME

[75] Inventors: Fumihiro Doura; Kazuo Asada, both of Sakai; Kouichi Inoue, Ikoma, all of Japan

[73] Assignee: Takeda Chemical Industries, Ltd., Osaka, Japan

[21] Appl. No.: 742,527

[22] Filed: Jun. 7, 1985

[30] Foreign Application Priority Data

Jun. 19, 1984 [JP] Japan .................. 59-127208

[51] Int. Cl.$^4$ ............................................. C08L 33/14
[52] U.S. Cl. .................... 525/100; 525/102; 525/288; 525/293; 525/328.2; 525/342; 525/370
[58] Field of Search ............ 525/100, 102, 328.2, 525/342, 288, 293, 370

[56] References Cited

U.S. PATENT DOCUMENTS

| | | | |
|---|---|---|---|
| 3,306,800 | 2/1967 | Plueddemann | 525/100 |
| 3,813,351 | 5/1974 | Thomson | 525/342 |
| 3,951,893 | 4/1976 | Gander | 525/342 |
| 4,206,299 | 6/1980 | Yamazaki . | |
| 4,296,008 | 10/1981 | St. Clair et al. | 525/102 |

FOREIGN PATENT DOCUMENTS 1056079  1/1967  United Kingdom .

*Primary Examiner*—Wilbert J. Briggs, Sr.
*Attorney, Agent, or Firm*—Wenderoth, Lind & Ponack

[57] ABSTRACT

A resin composition which comprises a coupling agent in an amount of about 0.5 part by weight to about 50 parts by weight against 100 parts by weight of a copolymer composed of an aminoalkyl acrylate and/or aminoalkyl methacrylate and an ethylenically unsaturated monomer.

The resin composition excels, as compared with the conventional ones, in terms of any properties to be developed toward a wide range of various substrates inclusive of inorganic materials and plastic materials, such as adherence, water resistance, weathering resistance and yellowing resistance, and consequently are advantageously used in such fields as coatings, adhesives and printing ink.

11 Claims, No Drawings

RESIN COMPOSITIONS AND PRODUCTS USING THE SAME

The present invention relates to resin compositions which are useful for paints, adhesives, printing ink, etc. and relates to products using the same.

The resins being generally used in such application areas as paints, adhesives and printing ink include various resins, such as those based on acrylates, vinyl acetate, vinyl chloride, epoxies, urethanes and alkyds, but these resins both offer advantages and suffer from disadvantages in terms of adherence, adhesion, water resistance, weathering resistance, yellowing resistance, etc. Also, the substrates to be bonded extend over a wide range of materials, such as inorganic materials exemplified by iron, aluminum, copper, lead and glass, and plastic materials exemplified by polyethylene, polypropylene, ABS resins, polyvinyl chloride, unsaturated polyesters, nylons and polycarbonates, and it is strongly demanded to develop a resin composition which can be applied to these substrates.

The present inventors, after extensive investigation, found that a resin composition formed by adding a specific ratio of a coupling agent to a copolymer composed of an amino-alkyl acrylate and/or aminoalkyl methacrylate and an ethylenically unsaturated monomer possesses excellent performance in terms of properties to be developed toward various kinds of substrates, such as adherence, adhesion, water resistance, weathering resistance and yellowing resistance, and the finding led to completion of the present invention.

Thus, the present invention is concerned with resin compositions, which comprises a coupling agent in an amount of about 0.5 part by weight to about 50 parts by weight against 100 parts by weight of a copolymer composed of an aminoalkyl acrylate and/or aminoalkyl methacrylate and an ethylenically unsaturated monomer and is concerned with products using the above compositions.

The copolymer, which is useful in the present invention, includes copolymers composed of an aminoalkyl acrylate and/or aminoalkyl methacrylate of the formula:

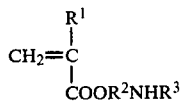

wherein $R^1$ is hydrogen or methyl group; $R^2$ is an alkylene or hydroxyalkylene group of 1 to 6 carbon atoms; $R^3$ is hydrogen or an alkyl group of 1 to 6 carbon atoms and an ethylenically unsaturated monomer.

Specific examples of the aminoalkyl acrylate and/or aminoalkyl methacrylate as referred to herein include, for example, acrylates, such as aminomethyl acrylate, aminoethyl acrylate, aminopropyl acrylate, amino-n-butyl acrylate, aminohexyl acrylate, N-methylaminoethyl acrylate, N-tert-butylaminoethyl acrylate and aminohydroxypropyl acrylate, and methacrylates, such as aminomethyl methacrylate, aminoethyl methacrylate, amino-n-butyl methacrylate, N-methylaminoethyl methacrylate, N-tert-butylaminoethyl methacrylate and aminohydroxypropyl methacrylate. The content of these aminoalkyl acrylates or aminoalkyl methacrylates in the copolymers is normally in the range of about 1 to 40 weight %, preferably in the range of about 2 to 20 weight %.

On the other hand, the ethylenically unsaturated monomer includes, for example, acrylates, such as methyl acrylate, ethyl acrylate, n-butyl acrylate and 2-ethylhexyl acrylate, methacrylates, such as methyl methacrylate, ethyl methacrylate and n-butyl methacrylate, vinyl esters of fatty acids, such as vinyl acetate and vinyl propionate, aliphatic monoolefins, such as ethylene, porpylene and isobutene, aromatic monoolefins, such as styrene and vinyltoluene, and others, such as acrylonitrile, vinyl chloride and vinyl fluoride. Out of the above monomers, copolymers composed mainly of acrylates and methacrylates are preferable in terms of weathering resistance, yellowing resistance, etc.

The copolymer composed of the aminoalkyl acrylate and/or aminoalkyl methacrylate and ethylenically unsaturated monomer is produced by conducting polymerization according to the conventional method in the presence of aromatic solvent, such as toluene, alcohol solvent, such as isopropanol or ester solvent, such as ethyl acetate, while using a radical polymerization initiator, such as azobis- or peroxide-based ones, in combination with such a chain-transfer agent as mercaptans, if necessary.

The weight average molecular weight of the copolymer is in the range of about 1,000 to 1,000,000, preferably in the range of about 5,000 to 500,000.

The coupling agent as used in the present invention denotes compounds which act on the interface between organic material and inorganic material to form a strong bridge between both materials through either chemical or physical bond, and normally includes compounds of silicon, titanium, aluminum, etc. having a group capable of bonding together organic and inorganic materials.

As the silicon compound, there may be mentioned silane coupling agents of the formula:

wherein $R^4$ is an alkyl of 1 to 6 carbon atoms having functional groups, such as chlorine and amino, ureido, glycidoxy, acryloxy, methacryloxy, mercapto and vinyl groups or vinyl groups; $R^5$ and $R^6$ independently are chlorine or hydroxyl, or acetoxy or alkoxy groups of 1 to 6 carbon atoms; a is 0, 1 and 2.

Specific examples of the above silicon compounds which are suitably used include, for example, γ-chloropropyltrimethoxysilane, γ-aminopropyltriethoxysilane, N-β-amino-ethyl-γ-aminopropyltrimethoxysilane, γ-glycidoxypropyl-trimethoxysilane, γ-methacryloxypropyltrimethoxysilane, γ-mercaptopropyltrimethoxysilane, vinyltriethoxysilane, vinyltrichlorosilane and vinyltriacetoxysilane.

The titanium compound includes coupling agents, such as tetraisopropyl titanate, tetraoctyleneglycol titanate, isopropyltristearoyl titanate, isopropyltris(dioctylpyrophosphate)titante, tetraisopropylbis(dioctylphosphite)titanate and bis(dioctylpyrophosphate)oxyacetate titanate.

Also, the aluminum compound can be exemplified by aluminum coupling agents, such as aluminum isopropylate, mono-sec-butoxyaluminum diisopropylate, aluminum acetylacetonate, aluminum oxyoctate and aluminum diisopropoxidomonoethylacetoacetate.

The addition amount of these coupling agents is in the range of about 0.5 part by weight to about 50 parts by weight against 100 parts by weight of the copolymer, preferably in the range of about 0.5 to 20 parts by weight. From the standpoint of water resistance, particularly, the silane coupling agents are preferred.

The resin composition of the present invention can be used in the form of solution in an organic solvent, such as ethyl acetate, isopropyl alcohol, methyl ethyl ketone, toluene and xylene, or emulsion dispersed in water, or in the non-solvent form when the copolymer shows a relatively low molecular weight. As the case may be, there can be added other resin, such as epoxy resins, plasticizers, fillers etc. The resin composition of the present invention is applied to a substrate.

The application rate is in such an amount as may provide a coating film of a thickness of about 1 to 100μ.

After the application, the substrate is allowed to stand at room temperature or heated to a temperature of about 80° to 230° C.

As the substrate, there can be used every kind of materials, for example, inorganic materials such as metal and glass, and organic materials such as plastic materials, wood, particle board, paper, slates, rubber and decorative sheet.

The resin composition of the present invention excels, as compared with the conventional ones, in terms of any properties to be developed toward a wide range of various substrates inclusive of inorganic materials and plastic materials, such as adherence, water resistance, weathering resistance and yellowing resistance, and consequently are advantageously used in such field as coatings, adhesives and printing ink.

Thus, the resin composition of the present invention can provide remarkable effects in eliminating such disadvantages of the need for selecting a resin suitable for each substrate according to the intended application field, the imperative necessity for complicated steps to make up for the unsatisfactory performance characteristics and the restrictions imposed on the application fields as having been encountered with the conventional resin compositions. The products obtained by the use of the resin composition of the present invention includes, for example, laminated structures, coated structures and printed films.

The examples and reference examples are described in the below to illustrate the present invention specifically; in the examples and reference examples, "part" and "%" denote "part by weight" and "weight %", respectively.

EXAMPLES 1 TO 3 AND REFERENCE EXAMPLES 1 TO 2

Given amounts (as described in Table 1) of γ-glycidoxypropytimethoxysilane as a silane coupling agent were added respectively to 330 parts (100 parts of the solid) of a toluene solution (with a solid content of 30% and a solution viscosity of 250 cps (at 25° C.) of a copolymer (with a weight average molecular weight of 90,000) composed of 10% of aminoethyl methacrylate, 60% of ethyl methacrylate and 30% of vinyl acetate, followed by mixing thoroughly to give adhesive compositions. The adhesive compositions were applied respectively to a 1-mm thick cold rolled iron plate (JIS G-3141) (to a thickness of coating film of 0.05 mm), followed by drying at 50° C. for 10 minutes. 0.2 mm thick soft polyvinyl chloride sheet was overlaid on the surface applied with the adhesive, and the laminated sheet was bonded together under the conditions of 150° C., 5 min and 2 kg/cm$^2$ by use of a heated press.

The bonding strengths as measured are shown in Table 1.

TABLE 1

|  | Example 1 | Example 2 | Example 3 | Ref. Example 1 | Ref. Example 2 |
| --- | --- | --- | --- | --- | --- |
| Adhesive composition: (part) | | | | | |
| Copolymer | 100 | 100 | 100 | 100 | 100 |
| Silane coupling agent | 5 | 20 | 40 | 0 | 60 |
| Bonding strength*: (kg/25 mm) | | | | | |
| Initial | 11 | 12 | 9 | 9 | 5 |
| After treatment in boiling water for 1 hour | 10 | 13 | 8 | 2 | 5 |

*180° Peeling strength, at 25° C. × 65% RH.

EXAMPLES 4 TO 7 AND REFERENCE EXAMPLE 3

To 330 parts (100 parts of the solid) of a toluene/methyl ethyl ketone solution (with a solid content of 30% and a solution viscosity of 150 cps. (at 25° C.)) of a copolymer (with a weight average molecular weight of 100,000) composed of 5% of aminohydroxypropyl methacrylate, 80% of methyl methacrylate and 15% of styrene was added 10 parts of mercaptopropyltrimethoxysilane as a silane coupling agent, followed by mixing thoroughly to give a paint composition. The paint composition was applied to each of the substrates as shown in Table 2) (to a thickness of dried coating film of 0.02 mm), followed by drying by heating at 150° C. for 20 minutes.

The experiment results obtained with the resulting painted samples are shown in Table 2.

Reference Example 3 involved the same procedure except that the silane coupling agent was not added.

TABLE 2

|  | Example 4 | Example 5 | Example 6 | Example 7 | Ref. Example 3 |
| --- | --- | --- | --- | --- | --- |
| Paint composition: (part) | | | | | |
| Copolymer | 100 | 100 | 100 | 100 | 100 |
| Silane coupling agent | 10 | 10 | 10 | 10 | 0 |
| Substrate | Galvanized sheet | Semi-rigid | Glass | FRP | Semi-rigid |

TABLE 2-continued

|  | Example 4 | Example 5 | Example 6 | Example 7 | Ref. Example 3 |
|---|---|---|---|---|---|
|  | iron | aluminum |  |  | aluminum |
| Adherence*¹ |  |  |  |  |  |
| Initial | 100/100 | 100/100 | 100/100 | 100/100 | 100/100 |
| After treatment in boiling water for 1 hour | 100/100 | 100/100 | 100/100 | 100/100 | 50/100 |
| Weathering resistance*² | No change | No change | No change | No change | No change |

*¹In accordance with JIS K-5400
*²Inspected for any change in appearance, after exposure in SunShine Weather-O-Meter for 500 hours.

EXAMPLE 8

To 330 parts (100 parts of the solid) of a tolutne/ethyl acetate solution (with a solid content of 30% and a solution viscosity of 120 cps (at 25° C.) of a copolymer (with a weight average molecular weight of 50,000) composed of 7% of aminoethyl acrylate, 70% of methyl methacrylate and 23% of butyl acrylate was added 20 parts of aluminum oxyoctoate as an aluminum coupling agent, followed by mixing thoroughly to give an adhesive composition, which exhibited excellent performance as was the case with the above examples.

EXAMPLE 9

To 330 parts of a toluene/ethyl acetate solution (with a solid content of 30% and a solution viscosity of 100 cps (at 25° C.)) of a copolymer (with a weight average molecular weight of 50,000) composed of 5% of aminopropyl acrylate, 60% of ethyl methacrylate and 35% of vinyl acetate was added 1 part of isopropyl tris(dioctylpyrophosphate)titanate as a titanium coupling agent, followed by mixing thoroughly to give an adhesive composition, which exhibited excellent performance as was the case with the above examples.

EXAMPLE 10

The adhesive composition as used in Example 1 was applied to a 1-mm thick galvanized sheet metal (to a thickness of coating film of 0.05 mm), followed by drying at 50° C. for 10 minutes. 0.2 mm-thick soft polyvinyl chloride sheet was overlaid on the surface applied with the adhesive, and the laminated sheet was bonded together under the conditions of 200° C., 1 min. and 2 kg/cm² by use of a heated press. The laminated sheet exhibited excellent performance as was the case with Example 1.

What is claimed is:

1. A resin composition which comprises a coupling agent of the formula:

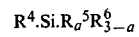

wherein R⁴ is an alkyl group of 1 to 6 carbon atoms substituted by chlorine, amino, ureido, glycidoxy, acryloxy, methacryloxy, mercapto or vinyl or a vinyl group; R⁵ and R⁶ independently are chlorine, hydroxyl, acetoxy or alkoxy group of 1 to 6 carbon atoms; a is 0, 1 or 2; a titanium coupling agent or an aluminum coupling agent, said coupling agents being employed in an amount of about 0.5 part by weight to about 50 parts by weight per 100 parts by weight of a copolymer composed of about 1 to 40% by weight of a compound of the formula:

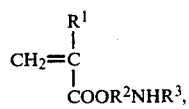

wherein
R¹ is hydrogen or methyl group,
R² is alkylene or a hydroxyalkylene group of 1 to 6 carbon atoms and
R³ is hydrogen; and an ethylenically unsaturated monomer.

2. The resin composition as claimed in claim 1, wherein the weight average molecular weight of the copolymer is in the range of about 1,000 to 1,000,000.

3. The resin composition as claimed in claim 1, wherein the coupling agent is a silane coupling agent of the formula:

wherein R⁴ is an alkyl group of 1 to 6 carbon atoms substituted by chlorine, amino, ureido, glycidoxy, acryloxy, methacryloxy, mercapto or a vinyl group, R⁵ and R⁶ independently are chlorine, hydroxy, acetoxy or alkoxy group of 1 to 6 carbon atoms and a is 0, 1 or 2.

4. The resin composition as claimed in claim 1, wherein the amount of the coupling agent is in the range of about 0.5 to 20 parts by weight against 100 parts by weight of the copolymer.

5. The resin composition as claimed in claim 1, wherein the copolymer is one composed of 10% of aminoethyl methacrylate, 60% of ethyl methacrylate and 30% of vinyl acetate.

6. The resin composition as claimed in claim 1, wherein the copolymer is one composed of 5% of aminohydroxypropyl methacrylate, 80% of methyl methacrylate and 15% of styrene.

7. The resin composition as claimed in claim 3, wherein the silane coupling agent is γ-glycidoxypropyltrimethoxysilane.

8. The resin composition as claimed in claim 3, wherein the silane coupling agent is mercaptopropyltrimethoxysilane.

9. The resin composition according to claim 1 wherein the silane compound is γ-chloropropyltrimethoxysilane, γ-aminopropyltriethoxysilane, N-β-aminoethyl-γ-aminopropyltrimethoxysilane, γ-glycidoxypropyl-trimethoxysilane, γ-methacryloxypropyltrimethoxysilane, γ-mercaptopropyltrimethoxysilane, vinyltriethoxysilane, vinyltrichlorosilane or vinyltriacetoxysilane.

10. The resin composition according to claim 1 wherein the titanium compound is tetraisopropyl titanate, tetraoctyleneglycol titanate, isopropyltristearoyl titanate, isopropyltris(dioctylpyrophosphate)titanate, tetraisopropylbis(dioctylphosphite)titanate or bis(dioctylpyrophosphate)oxyacetate titanate.

11. The resin composition according to claim 1 wherein the aluminum compound is aluminum isopropylate, mono-sec-butoxyaluminum diisopropylate, aluminum acetylacetonate, aluminum oxyoctate or aluminum diisopropoxidomonoethylacetoacetate.

* * * * *